(12) United States Patent
Mackay

(10) Patent No.: US 9,365,944 B2
(45) Date of Patent: Jun. 14, 2016

(54) METHOD OF MAKING HYDRALIC TUBING

(75) Inventor: Gary Mackay, Ancaster (CA)

(73) Assignee: Tube-Mac Piping Technologies LTD., Ontario (CA)

( * ) Notice: Subject to any disclaimer, the term of this patent is extended or adjusted under 35 U.S.C. 154(b) by 735 days.

(21) Appl. No.: 13/475,506

(22) Filed: May 18, 2012

(65) Prior Publication Data

US 2013/0306185 A1   Nov. 21, 2013

(51) Int. Cl.
*C25D 5/02* (2006.01)
*C25D 7/04* (2006.01)

(52) U.S. Cl.
CPC ............. *C25D 5/022* (2013.01); *C25D 5/028* (2013.01); *C25D 7/04* (2013.01)

(58) Field of Classification Search
CPC .......... C25D 7/04; C25D 5/022; C23C 2/006; C23C 2/14; C23C 2/185; C23C 2/38
USPC ........................................................ 205/151
See application file for complete search history.

(56) References Cited

U.S. PATENT DOCUMENTS

| | | | | |
|---|---|---|---|---|
| 3,573,111 | A | * | 3/1971 | Thurston ................. 428/328 |
| 3,598,156 | A | | 8/1971 | Ulmer et al. |
| 3,625,777 | A | * | 12/1971 | Okabe et al. ............. 148/259 |
| 3,957,086 | A | | 5/1976 | Gondek |
| 4,853,297 | A | | 8/1989 | Takahashi et al. |
| 4,885,215 | A | | 12/1989 | Yoshioka et al. |
| 5,251,804 | A | | 10/1993 | Nakamura |
| 6,528,125 | B1 | | 3/2003 | Jackson et al. |
| 7,192,656 | B1 | * | 3/2007 | Tai .......................... 428/659 |
| 2005/0031894 | A1 | * | 2/2005 | Klos et al. ................ 428/659 |
| 2006/0169368 | A1 | * | 8/2006 | Lopez et al. ............. 148/332 |
| 2008/0063887 | A1 | | 3/2008 | Nakamura et al. |

FOREIGN PATENT DOCUMENTS

JP   408168720 A   7/1996

* cited by examiner

*Primary Examiner* — Luan Van
*Assistant Examiner* — Louis Rufo
(74) *Attorney, Agent, or Firm* — Buchanan Ingersoll & Rooney PC

(57) ABSTRACT

In a method for making hydraulic tubing a low carbon steel tube suitable for use as hydraulic tubing is coated on its inside surface with zinc phosphate and the outside surface is electroplated. The resulting hydraulic tubing will resist rust on the inside and on the outside during storage.

9 Claims, 2 Drawing Sheets

METHOD OF MAKING HYDRALIC TUBING

FIELD OF INVENTION

The invention relates to methods for making hydraulic tubing used to handle hydraulic fluid and other liquids at high pressures.

BACKGROUND OF THE INVENTION

Hydraulic tubing is used in a variety of machines and manufacturing facilities to carry hydraulic fluid and other liquids at high pressures and sometimes at elevated temperatures. Typically hydraulic tubing is made from low carbon steel or stainless steel and is usually sold in lengths 20 feet long. Hydraulic tubing typically has an outside diameter for from 3/16 to 1-1/4 inches and a wall thickness of from 0.035 to 0.120 inches. When sold in metric sizes hydraulic tubing typically has an outside diameter for from 4 to 28 mm and a wall thickness of from 0.50 to 3.00 mm.

Hydraulic tubing made from low carbon steel is zinc plated on the outside surface but no coating is applied to the inside surface. Sometimes caps are placed over the ends of the tubes for storage. While the tubes are in storage rust frequently forms on the inside surface of the tubes. This can happen even if the ends of the tubes are capped. If the rust is not removed before the tubes are put in service, rust particles may migrate from the surface of the tube into fluid passing through the tube thereby contaminating the fluid. Rusting is not a problem with stainless steel tubing, but those tubes are more expensive than low carbon steel tubes.

It is well known in the art to provide coatings on metal surfaces to resist rust. Such coatings include latex paints, oils, polymer coatings, phosphate coatings, and electroplating. Nevertheless, the art has only electroplated the outside of low carbon steel hydraulic tubes with the inside surface being bare metal. This may have been done under the mistaken belief that rusting did not occur on the inside surface of the low carbon steel hydraulic tubes or that any rusting that did occur was insignificant. However, I have observed that significant rusting can occur when conventional low carbon steel hydraulic tubes are stored for several months, particularly, if the tubing is exposed to rain or snow while in storage. I have also found that such rusting can adversely affect the performance of hydraulic fluid passing through such rusted low carbon steel hydraulic tubes. Furthermore, capping the ends of the tubes does not solve the problem. Consequently, there is a need for low carbon steel hydraulic tubes that will not rust while in storage.

SUMMARY OF THE INVENTION

I provide a method for making hydraulic tubing in which I select a low carbon steel tube suitable for use as hydraulic tubing. Then I coat the inside surface and outside surface of the tube with zinc phosphate and apply oil to the coated surfaces. Next I cap the ends of the tube and electroplate the outside surface with zinc. The resulting tube will have a zinc phosphate and coating on the inside and zinc plating on the outside. These coatings prevent rust from forming.

I prefer to apply the zinc phosphate coating by dipping the tube into a zinc phosphate solution. That will apply zinc phosphate on both the inside surface and the outside surface of the tube. I may also apply oil over the phosphate. I apply the zinc electroplating over the zinc phosphate on the outside of the tube.

This process will create a low carbon steel hydraulic tube having a zinc coating on the inside and zinc electroplating on the outside. The tube so made will not rust during storage.

Other objects and advantages of my process and the resulting product will become apparent from a description of certain present preferred embodiments thereof shown in the accompanying drawings.

DESCRIPTION OF THE PREFERRED EMBODIMENTS

Figure 1:
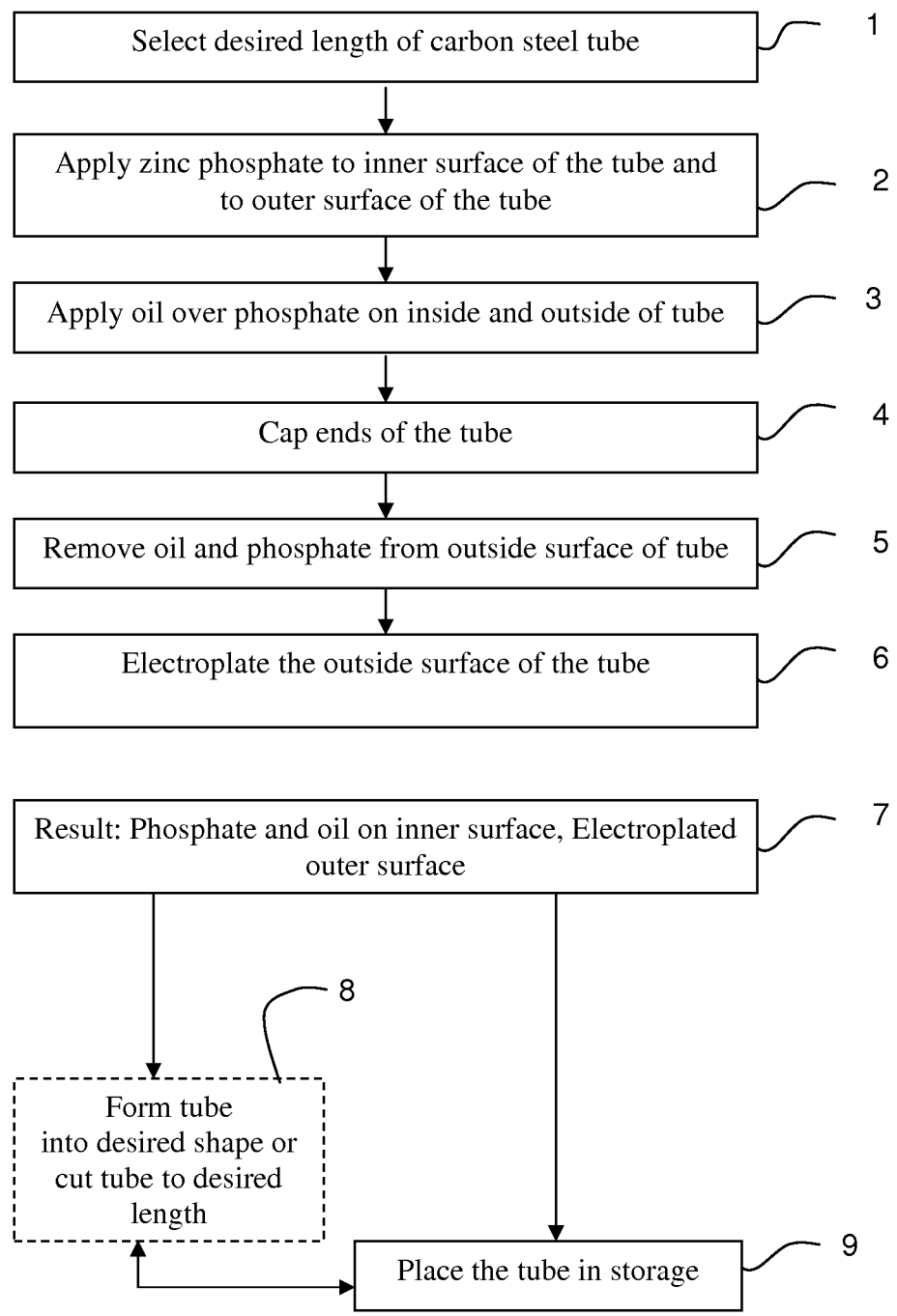
FIG. 1 is a flow chart showing present preferred embodiments of my method for making hydraulic tubes.

I provide a process for making hydraulic tubes containing the steps indicated by the solid boxes 1 through 6 in FIG. 1. First I select a low carbon steel pipe suitable for use as hydraulic tubing as indicate by box 1. This tubing will typically be a length of tubing 20 feet (or about 7 meters) long having an outside diameter of from 3/16 to 1-1/4 inches and a wall thickness of from 0.035 to 0.120 inches or an outside diameter for from 4 to 28 mm and a wall thickness of from 0.50 to 3.00 mm. The steel should meet SAE specification J524 (seamless low carbon steel tubing annealed for bending & flaring) and should have a tensile strength of 55,000 psi. The tubing should also have a working pressure rating based on SAE Specification J1065 of at least 1,000 psi and a burst pressure rating of at least 8,000 psi.

The next step, indicated by box 2 in FIG. 1, is to apply a zinc phosphate coating to the outside surface and the inside surface of the tube. This can be done using a spray device can be inserted into the tube. An easier, less expensive process would be to dip the tube in a zinc phosphate solution. BONDERITE conversion coating material available from Henkel can be used for this purpose. Whatever method is used to apply the zinc phosphate material there will be a zinc phosphate coating on both the inside surface and the outside surface of the tube.

The third step, indicated by box 3 in FIG. 1, applies oil over the phosphate coating on both the inside surface and the outside surface of the tube. Next the ends of the tube are capped, I remove the oil and phosphate from the outside of the tube at step 5. Then the outside surface is electroplated. Low carbon steel hydraulic tubes typically have a zinc electroplate coating on the exterior surface. Therefore, I prefer to apply a zinc electroplate. However one could use chrome or other corrosion resistant electroplating.

After the zinc coating has been applied to the interior surface of the tube and the exterior surface has been electroplated, then the tube is finished at step 7. That tube has a phosphate and oil coating on the inside surfaces and a plated outside surface. Both surfaces resist rusting. Typically the tube will be placed in storage as indicated by box 9 in FIG. 1. If desired one could keep the caps on the ends of the tube during storage to keep insects and dirt out of the tube while it is being stored. An optional step is indicated by box 8 shown in dotted line in FIG. 1 is to form the tube into a desired shape or cut the tube to a shorter length before storage.

While I prefer to apply an oil over the zinc coating on the inside surface or over the electroplating on the outside surface, it is not necessary to coat either surface with oil to protect the surface from rust.

In most instances the hydraulic tubes made by my process will be stored for several weeks or months before being put into service. However, in some instances the tubing may be cut and/or bent into a size and shape for installation immediately after the tube has been made.

Figure 2:
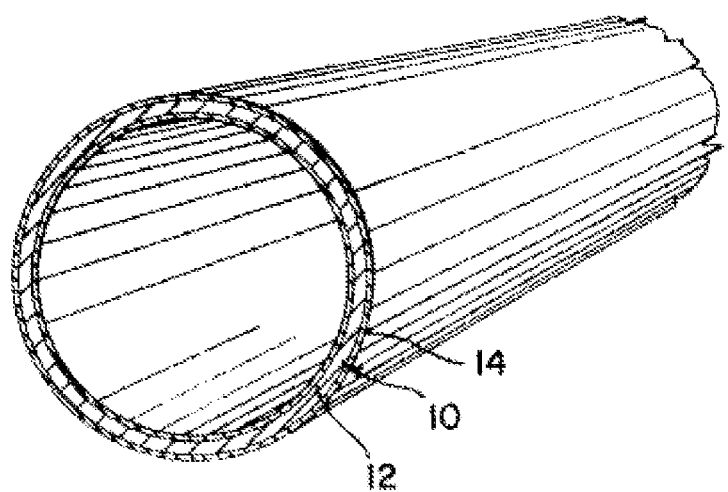
FIG. 2 is a perspective view of a present preferred embodiment of a portion of my hydraulic tubing.

The resulting product will be the tube 10 shown in FIG. 2. That tube will have a zinc phosphate and oil coating 12 on the inside surface and zinc electroplate coating 14 on the outside surface. These coatings 12 and 14 are shown in FIG. 2 to be much thicker relative to the diameter of the tube than they would be in practice so that one can see the coatings in the drawing.

While I have shown and described certain present preferred embodiments of my method of making hydraulic tubing it should be understood that the invention is not limited thereto but may be variously embodied within the scope of the following claims.

I claim:

1. A method for making hydraulic tubing comprising:
   selecting a desired length of low carbon steel tube having an inside surface, an outside surface and open ends;
   applying zinc phosphate to the inside surface and the outside surface to create a zinc phosphate coating on the inside surface and on the outside surface;
   applying oil over the zinc phosphate coating on the inside surface;
   removing the zinc phosphate coating from the outside surface; and electroplating the outside surface;
   thereby making hydraulic tubing having on the inside surface a zinc phosphate coating with oil over the zinc phosphate coating and having electroplating on the outside surface.

2. The method of claim 1 wherein the zinc phosphate coating is applied to the inside surface and outside surface by immersing the length of low carbon steel tube into a zinc phosphate dip.

3. The method of claim 1 wherein the outer surface is electroplated with a zinc electroplating.

4. The method of claim 1 also comprising applying an oil over the outside surface after applying the zinc phosphate coating to the inside surface and the outside surface.

5. The method of claim 1 also comprising capping the ends of the tube prior to electroplating the outside surface.

6. The method of claim 1 also comprising forming the tube into a desired shape.

7. A method for making hydraulic tubing comprising:
   selecting a desired length of low carbon steel tube having an inside surface, an outside surface and open ends;
   applying zinc phosphate to the inside surface and the outside surface to create a zinc phosphate coating on the inside surface and on the outside surface;
   applying oil over at least a portion of the phosphate coating on the inside surface;
   capping the open ends;
   removing oil and the phosphate coating from the outside surface; and
   electroplating the outside surface;
   thereby making hydraulic tubing having on the inside surface a zinc phosphate coating with oil over at least a portion of the zinc phosphate coating and having electroplating on the outside surface.

8. The method of claim 7 wherein the zinc phosphate coating is applied to the inside surface and outside surface by immersing the length of carbon steel tube into a zinc phosphate dip.

9. The method of claim 7 wherein the outer surface is electroplated with a zinc electroplating.

* * * * *